Patented Feb. 9, 1937

2,070,359

UNITED STATES PATENT OFFICE 2,070,359

COLORED GRANULE

Carl E. Hillers, Charlottesville, Va., assignor to Blue Ridge Slate Corporation, Charlottesville, Va., a corporation of Virginia No Drawing. Application March 21, 1935, Serial No. 12,256

29 Claims. (Cl. 91—70)

This invention relates to new and useful improvements in the manufacture of colored granular material such as is used for the surfacing of asphaltic shingles and roofing, for drive-ways, tennis courts, and the like.

The material best suited for the above varied uses differs considerably in size of particles and also in color, but, in general, the process I employ is capable of producing economically and in quantity colored particles which, if properly sorted for size, can be applied to the above uses. Natural sand, fine gravel, crushed pebbles, crushed minerals or rock, or other refractory materials are all suitable for practicing the invention.

According to the main feature of the present invention, refractory granules are covered with an insoluble weather resistant coating comprising cryolite ($3NaF.AlF_3$) either natural or synthetic, and preferably also a coloring material.

I have found that a surface coating of cryolite fused over the exterior of particles of mineral matter provides a weather resistant coating which will firmly adhere to asphalt shingles or the like, and which may be colored more cheaply than other types of fused coatings generally used on granular mineral matter.

By the use of cryolite in preference to other coating materials the colors applied are usually deeper in tone or darker in shade. Furthermore, a color intensity of a certain depth may be produced with less coloring material. In the production of colored granules, especially greens from chrome oxide or chromium salts or of blues from cobalt oxide, cobalt carbonate, etc., the colored material is the most expensive of the ingredients used. Therefore, the use of coatings of fused cryolite upon granulated mineral matter, fine pebbles, sand, etc. makes possible the inexpensive manufacture of weather resistant colored products which are equal in every respect to such colored granular material produced by other more expensive methods.

The coloring imparted to granular mineral matter, such as quartzite, by the use of fluxes, such as sodium nitrate, borax, boric oxide, etc. alone is quite weak, unless large amounts of the fluxing material, together with nominal amounts of the coloring principle, or nominal amounts of the fluxing ingredients together with large amounts of the coloring principle, are used.

Besides the chemical differences exerted by virtue of the fluoride content of cryolite upon silicious bases, and the optical effect due to the opacity of cryolite itself, coatings of cryolite upon granules have the following advantages over insoluble glass coatings as far as pigmentation is concerned:

1. With one group of pigments, the color produced is deeper. Examples—$Cr_2O_3$.
2. With another group of pigments, the color effects produced are novel, unusual and unpredictable. Example—Copper compounds.
3. With a third group of substances, deeply colored instead of uncolored or faintly colored coatings are produced. Example—Iron oxides or iron containing pigments.

In the glass industry, cryolite has been characterized as a flux, but it has been most extensively used in the production of opalescent glasses or enamels. It is probable that in its present application the color intensifying value of cryolite is due in some measure to its opacifying effect. However, the opacifying effect of cryolite in glass manufacture is dependent upon its relatively poor solubility or immiscibility during the fusion with the other ingredients of the glass. In that respect, the fundamental principle of my invention is entirely different, since it is not necessary to have other glass forming ingredients in the cryolite coating to produce the color intensifying effect, although it may be desirable to add one or more glass forming ingredients to produce certain additional effects. It should be noted also that most glazes dissolve a considerable part of the color principle forming colored metal silicates or boro-silicates, whereas the solvent action of cryolite in the temperatures I employ is low.

As a further illustration of the chemical and optical differences of coatings of cryolite on granules as compared to other types of coatings, the effect upon iron compounds can be cited. Many iron oxides and iron containing pigments, which are practically worthless because of loss of color in metal glass or glaze coating of granules at the temperatures employed commercially, exert their colors very effectively and efficiently in a coating of cryolite on similar granule bases, even in the presence of boric acid.

In producing colored granules which may be used to surface asphalt shingles and the like, the commercial appeal of the color effects must be kept in mind. The average purchaser of roofing desires the roof of his house to be of good strong color and not of a pastel shade. In the application of many of the commercial formulas for producing glassy coatings on crushed white gravel, quartz, etc., the dissolving of the coloring metal oxide in the form of a metal silicate or a metal boro-silicate, too frequently produces granules of so light green a color that the granules do not appeal to many prospective purchasers of shingles. One of the largest selling materials used for surfacing roofing has been natural blue-black slate. This material is dark, bluish gray, almost black in color, and despite the appearance during recent years of bright colored roofing granules, the popularity of blue-black slate as a surfacing for prepared roofings continues.

It has been the desire among some manufacturers of roofing granules to produce granules of a dark green shade, but no natural material is available which completely fills the requirement. Such granular bases as have been tried are either not sufficiently green or dark in themselves, or they do not lend themselves well to the production of dark colors by heat processes for various reasons. Primarily high temperatures such as have been proposed for the production of darker shades of green on slate result in the formation of granules which cause the surface of asphaltic roofings to blister badly upon exposure on roofs under normal summer conditions, and are the cause of much complaint. Furthermore, trouble is encountered in obtaining the proper or desired color in the finished granule because the materials which are nearest in color and apparently most suitable by nature for use as the granular base, almost invariably turn brownish upon heating, either alone or by reaction with the coating and/or coloring ingredients, and the shade of green produced is not that desired.

I have found that these objections can be overcome even with an originally light colored base by applying thereto an opaque coating containing the coloring materials. The opaque coating I obtain by melting on the surface of the granular base natural or synthetic cryolite or its ingredients. When a given amount of coloring material, such as chrome oxide, is incorporated into the coating, as I will subsequently demonstrate, the effect upon the eye is quite different from that produced by the coatings of common glass-forming materials containing the same amount (or proportion, based on the weight of the granules) of chrome oxide. Colors many shades darker result than was heretofore the case.

The following illustrates on a laboratory scale my method of producing cryolite coated granules:

Place 100 grams of dust free screened white sand in a container, add thereto about 30 drops of water and stir for about one minute with a paddle, in order to wet the surfaces of the sand particles. Then add 0.75 grams of powdered cryolite and the same amount of powdered chromium oxide and stir for about two minutes. Transfer the wet coated sand to a metal crucible or tray and heat in an electric furnace to a temperature of 1600 to 1650° F. for about seven to ten minutes, or longer. If a single pointed metal rake or its equivalent is used to stir the batch occasionally during the heating, it will be observed that after three or four minutes heating the hot coated sand becomes fairly sticky, due to the fusion of the cryolite. After allowing sufficient time completely and thoroughly to fuse the cryolite on all the granules, (higher temperatures or longer exposure to heat are not objectionable) remove the metal crucible from the furnace and cool the coated sand.

A dark green coated sand will be produced. Colored sand of slightly improved appearance may be produced by using a glue or adhesive solution, instead of plain water, to wet the granules. Small amounts of fluxing materials may be incorporated with the cryolite and coloring principle in order to permit the fluxing to take place at a lower temperature than indicated in the above example.

While in the foregoing example I have mentioned a temperature of 1600 to 1650° F., I do not wish to restrict myself to that temperature, because in the commercial application of my process a higher temperature is sometimes of assistance in fully developing the value of the coloring principle, while in other instances, the maximum value from the coloring principle can be developed at temperatures below 1650° F.

As fluxing materials which I have found to be compatible with my cryolite coatings, I might mention barium borate, colemanite, and boric acid. In the presence of these fluxes, cryolite retains its color intensifying properties, but the use of borax or alkalies in general tends to weaken the color.

Obviously, in the commercial production of such granules, a batch heating furnace or a rotary kiln is used and the manual stirring is replaced by well-known automatic operations.

As a granular base for my coloring process I prefer refractory granules of mineral matter of one of two types, depending upon their intended use, either nearly round or cleanly broken fragments with well smoothed surfaces as free as possible from porosity and absorptiveness. The first type is illustrated by a good round-grained sand and the second type by a crushed gravel of the character found in certain deposits in Monmouth and Ocean Counties, New Jersey, and elsewhere. I prefer a minimum of porosity or absorptiveness to eliminate the presence of pockets in which moisture or air can collect or be retained after the coating has been applied and heated, thus avoiding the formation of blisters on shingles surfaced therewith. I find that during the heating of such granules coated with cryolite and the coloring oxide, sufficient of the fluoride content of the cryolite is volatilized at the melting point under the proper conditions to etch and roughen the surfaces of the granule base. This effect may be increased by heating in a covered tray. Furthermore, the cryolite though melted, does not readily flow at the temperatures I employ, and upon cooling, the molten cryolite sets up or hardens into an irregular rather than a smooth surface, producing granular material with roughened surfaces which consequently is well retained by the asphalt of the shingles. By varying the temperatures during the heating process, the amount of roughening may be varied or controlled. The same objective may be accomplished by the use of one or more fluxes in conjunction with the cryolite, the use of larger amounts of fluxes tending to smooth the surfaces, whereas small or intermediate amounts produce effects in which the surface coatings of color-bearing cryolite are only partly smoothed out. The extent of the formation of volatile fluorides at the heating temperatures may to some extent be controlled or varied by the selection of the flux or the nature of the flux, as for example, acidic fluxes, such as boric acid, appear to cause more volatilization of fluorides than alkaline fluxes.

Not all glass-forming coatings may be darkened by the addition of cryolite. The mixing procedure employed, the amount of alkaki oxides present, the kind of adhesive used, the amount of formula materials employed, the nature of the coloring substance, the kind of granular base and the temperature employed during the heat treatment are all individually important factors. For instance, it is possible to produce metal coated granular material in bulk by the use of cryolite. Such granules may be prepared at low cost, they are uniformly coated with a thin metallic layer which resists normal weathering, they may be prepared in a variety of shades, and they fulfill a demand for a low cost surfacing or decorative material in a variety of uses.

To illustrate the preparation of metallic coated granules proceed as follows:

To 100 grams of sand or crushed light colored gravel in a container add 2.5 grams of a slightly alkaline casein solution or of an alum-glue solution and stir for about two minutes to get the adhesive well distributed over the surface of the granular material. Then add 0.75 gram of powdered cryolite of good quality, 0.75 gram of finely ground red copper oxide (preferably precipitated) and 0.50 gram of powdered boric acid. I prefer to mix these dry ingredients together first and then stir for about four minutes more or less. The wet coated granules are then placed in a steel tray, preferably hot, and heated at 1600 to 1650° F. for about five or ten minutes in an electric oven with occasional agitation or stirring, e. g., by means of a long handled metal single tooth rake. At the end of the heating period pour the hot granules out to cool, and they will be found to be well coated with a steel-gray colored metal alloy.

Boric acid is used as a flux to cause the cryolite to melt at a lower temperature. Boric acid becomes sticky at lower temperatures (400° F.) than cryolite and assists in keeping the cryolite mechanically attached to the granule until the temperature is high enough to melt the cryolite.

Other adhesives may be used in place of those mentioned but for this particular formulation and objective, I do not use sodium silicate because it frequently results in blue-green colored glassy granules instead of metal coated granules. The adhesive may be omitted entirely and replaced by about 2.0 grams of water, and the granules will come out of the heating treatment with a metal coating although not as uniformly coated as when an adhesive is used. The amounts of the ingredients (copper oxide, cryolite, and boric acid) may be increased or decreased to produce varied effects. The red copper oxide may be replaced by black cupric oxide or even salts of copper, such as hydrated cupric sulphate, with similar effects. The boric acid may be omitted entirely and the granules will be metal coated after the heating treatment, but I prefer to use some agent like boric acid because the metal coatings are thereby enhanced in appearance. The cryolite may be increased or decreased but with less than 0.35 gram in the above illustration, the results are apt to be colored rather than metal coated granules.

It is essential that the atmosphere during the final stage of the heating shall be oxidizing to produce metal coatings. A reducing atmosphere in the final stages will produce pink or red colored granules at temperatures below about 1650° F. and greenish brown colored granules at temperatures above about 1700° F.

The temperature must not exceed 1650° F. (approximately) during the final heating stage in the oxidizing atmosphere, or the granules will be of greenish brown color rather than metal coated.

Regardless of what the heating temperature or the character of the atmosphere during the early stages of the heating may be within reasonable limits, an oxidizing atmosphere and a temperature of 1600–1650° F. in the final stage for five minutes will produce metal coatings.

I am aware that the formation of copper-aluminum alloys has been known for many years, but to my knowledge such reactions have not hitherto been used in the metal coating of granules, resulting in the production of new and commercially valuable coated granules.

I find that a rotary type batch heating furnace is well adapted to the manufacture of these metal coated granules commercially, since it is possible by oil or gas firing to obtain the desired temperature, and then by shutting off the flame, to allow the metal coating to develop in a full oxidizing atmosphere.

In using an inclined rotary kiln for a continuous process, I find it economical to heat by an oil or gas burner introduced well into the kiln, allowing a full oxidizing atmosphere in the zone beyond the burner and before the discharge, assisting the maintenance of the necessary temperature by a non-reducing source of heat, such as electrically heated coils or bars, if needed.

What I claim is:

1. The process of applying a continuous colored coating to the surfaces of roofing granules of refractory mineral material comprising the steps of applying to the granules powdered cryolite, water and coloring agent, and heating to a temperature of 1600–1700° F.

2. The process of applying a continuous colored coating to the surface of roofing granules of refractory mineral material comprising the steps of applying to the granules dry, powdered cryolite, a liquid adhesive and coloring agent, and heating to a temperature of 1600–1700° F.

3. The process according to claim 1 and in which a flux is applied.

4. The process according to claim 2 and in which a flux is applied.

5. The process according to claim 2 and in which flux less in weight than the cryolite is applied.

6. The process of applying a continuous colored coating to the surface of roofing granules of refractory mineral material comprising the roughening and etching of the granules by depositing thereon, coloring material and heat softened cryolite.

7. As a new article of manufacture roofing granules of refractory material having a continuous coating of cryolite.

8. As a new article of manufacture roofing granules of refractory material having a continuous coating of colored cryolite.

9. The process of producing metal coated roofing granules, comprising the steps of applying a coating containing cryolite and a compound of copper to the granules, heating the granules, maintaining the granules, at least during the latter part of the heating, in a substantially oxidizing atmosphere, and finally cooling the granules.

10. As a new article of manufacture roofing sheets impregnated with asphalt and surfaced with cryolite coated refractory granular material.

11. As a new article of manufacture, roofing sheets impregnated with asphalt and surfaced with colored cryolite coated refractory granular material.

12. As a new article of manufacture, refractory mineral roofing granules having a continuous coating of the fusion product of cryolite, water and coloring agent.

13. As a new article of manufacture, refractory mineral roofing granules having a continuous coating of the fusion product of cryolite, a liquid adhesive, and coloring agent.

14. As a new article of manufacture, refractory mineral roofing granules having a continuous coating of the fusion product of powdered cryolite, a liquid adhesive, a coloring agent, and a flux.

15. As a new article of manufacture, refractory mineral roofing granules having a continuous coating of the fusion product of cryolite and a compound of copper.

16. As a new article of manufacture, refractory mineral roofing granules having a continuous coating of the fusion product of cryolite, a compound of copper and a material selected from the group consisting of boric acid, barium borate and colemanite.

17. The process of producing metal coated roofing granules, comprising the steps of applying a layer of adhesive to the granules, then applying powdered cryolite, a compound of copper and a material selected from the group consisting of boric acid, barium borate and colemanite, heating the coated granules to a temperature of 1500–1650° F. at least part of the time in substantially oxidizing atmosphere and finally cooling the granules.

18. As a new article of manufacture, refractory mineral roofing granules having a continuous coating of the fusion product of cryolite, a liquid adhesive, and chrome oxide.

19. As a new article of manufacture, refractory mineral roofing granules having a continuous coating of the fusion product of cryolite, chrome oxide, a flux, and a liquid adhesive.

20. As a new article of manufacture, refractory mineral roofing granules having a continuous coating of the fusion product of cryolite, a coloring agent, a liquid adhesive, and a material selected from the group consisting of boric acid, barium borate and colemanite.

21. As a new article of manufacture, refractory mineral roofing granules having a continuous coating of the fusion product of cryolite, chrome oxide, colemanite, and a liquid adhesive selected from the group consisting of aqueous alkaline casein and aqueous alum-glue.

22. Roofing sheets impregnated and coated with bituminous material and surfaced with the granules of claim 21.

23. The process of coloring the surfaces of mineral roofing granules comprising the steps of, first, coating refractory granules of mineral matter with powdered cryolite, coloring agent, a material selected from the group consisting of boric acid, colemanite and barium borate, and an adhesive selected from the group consisting of aqueous alkaline-casein and aqueous alum-glue; second, heating the coated granules to cause the cryolite to melt and adhere to the mineral granules; and third, cooling the granules to cause the cryolite to solidify while adhering to the mineral granules.

24. In the method of making green roofing granules the steps of, first, coating in bulk refractory granules of mineral matter throughout substantially all their surfaces with powdered cryolite, chrome oxide, aqueous alkaline-casein and a material selected from the group consisting of boric acid, colemanite and barium borate; second, heating the coated granules to cause the cryolite to melt and adhere to the mineral granules; and third, cooling the granules to cause the cryolite to solidify while adhering to the mineral granules.

25. As a new article of manufacture, roofing granules of refractory mineral material having a continuous coating of the fusion product of cryolite, chrome oxide and a liquid adhesive selected from the group consisting of aqueous alkaline-casein and aqueous alum-glue.

26. As a new article of manufacture, roofing granules of refractory mineral material having a continuous coating of the fusion product of cryolite, chrome oxide, colemanite and a liquid adhesive selected from the group consisting of aqueous alkaline-casein and aqueous alum-glue.

27. Roofing sheets impregnated and coated with bituminous material, and surfaced with the granules of claim 26.

28. As a new article of manufacture roofing granules of refractory mineral material having a continuous coating of the fusion product of cryolite, chrome oxide, barium borate and a liquid adhesive selected from the group consisting of aqueous alkaline-casein and aqueous alum-glue.

29. Roofing sheets impregnated and coated with bituminous material, and surfaced with the granules of claim 28.

CARL E. HILLERS.